(No Model.) 5 Sheets—Sheet 2.
F. SHICKLE.
PIPE MOLDING APPARATUS.
No. 295,205. Patented Mar. 18, 1884.
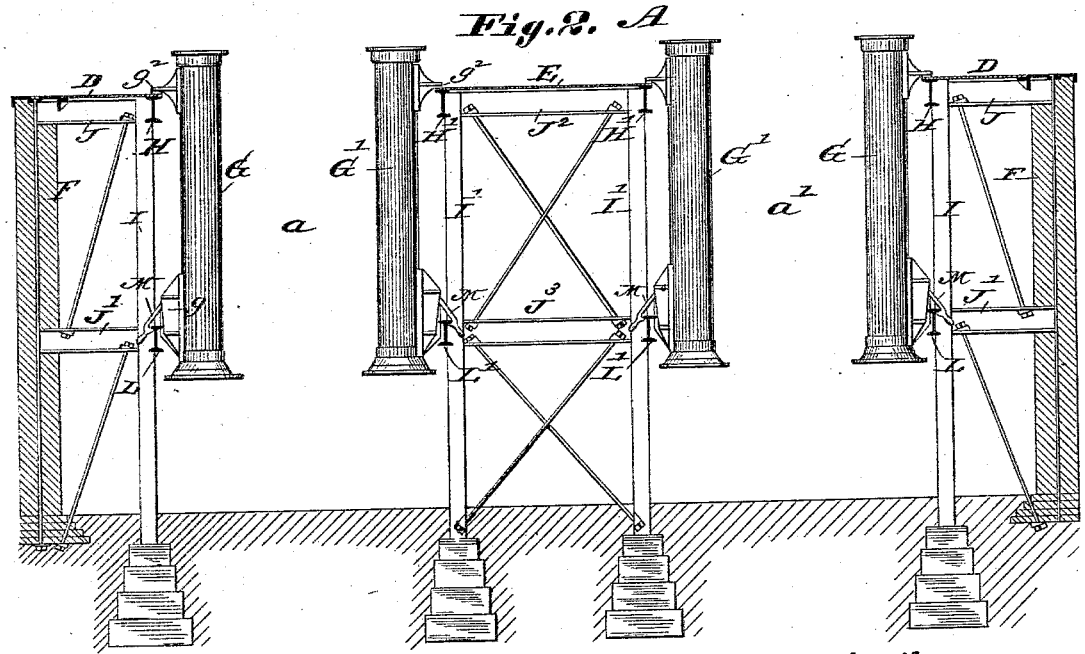
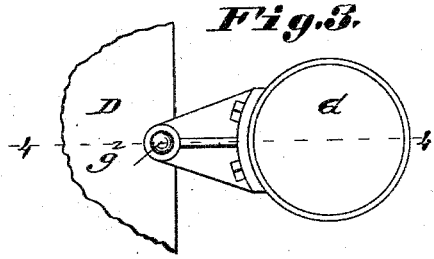
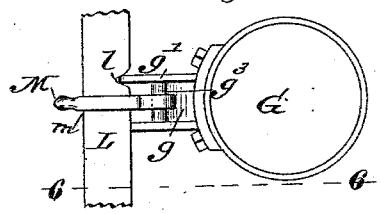
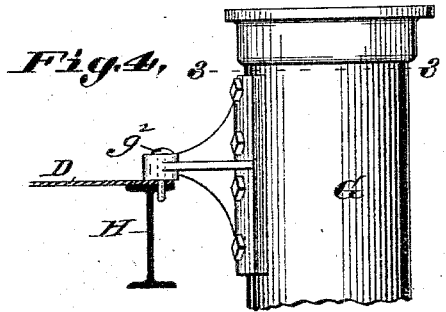
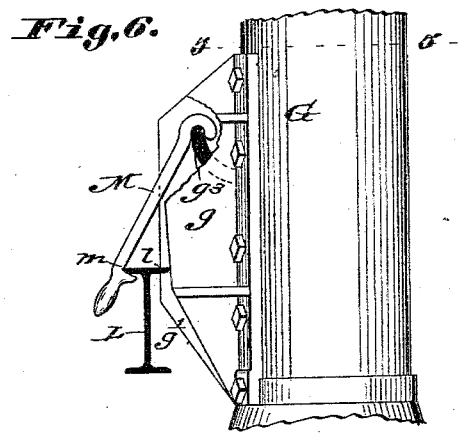
Attest:
J. W. Cooke
W. J. Kes—
Inventor:
Frederick Shickle
by C. D. Moody atty (No Model.) 5 Sheets—Sheet 3.
F. SHICKLE.
PIPE MOLDING APPARATUS.
No. 295,205. Patented Mar. 18, 1884.
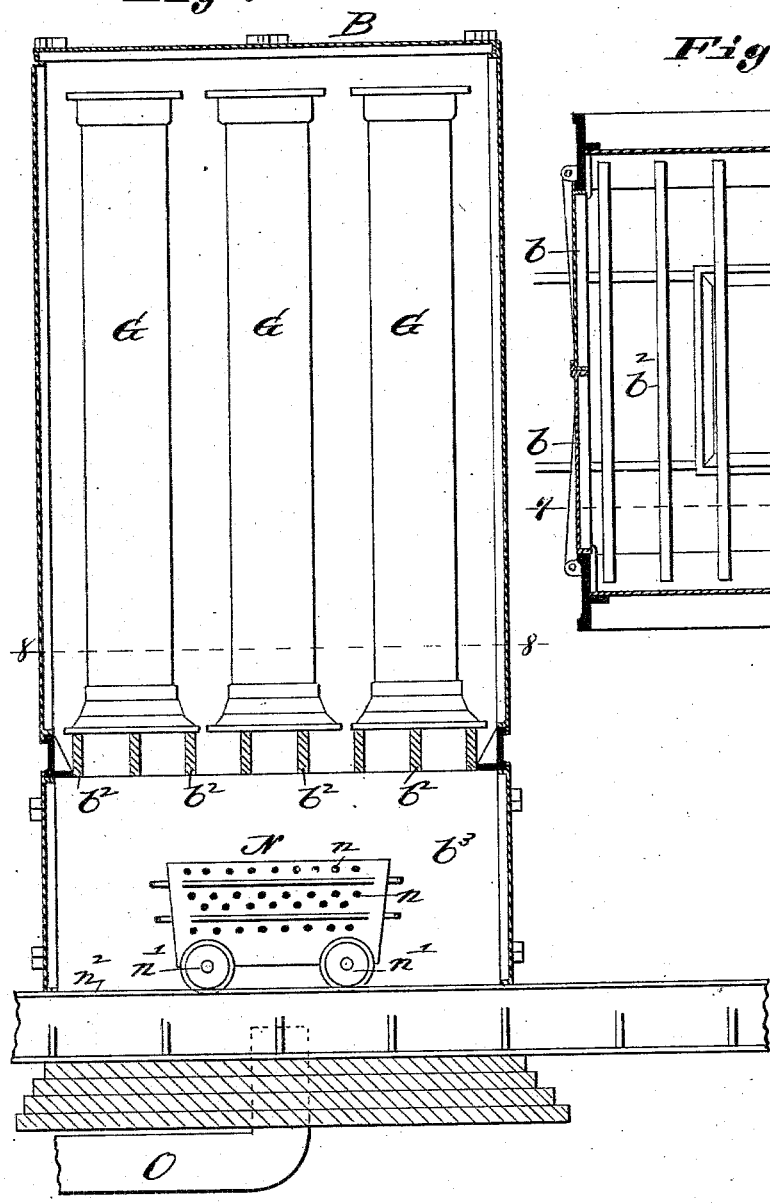
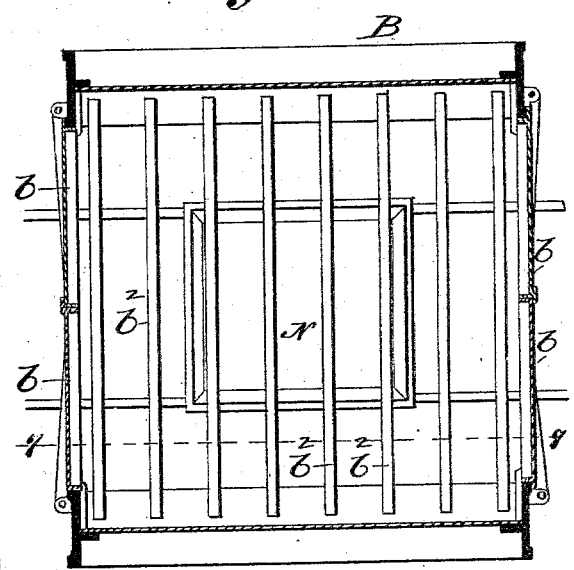
Attest:
J. W. Hoke.
W. J. Kesl.
Inventor:
Frederick Shickle
by C. D. Moody
atty.

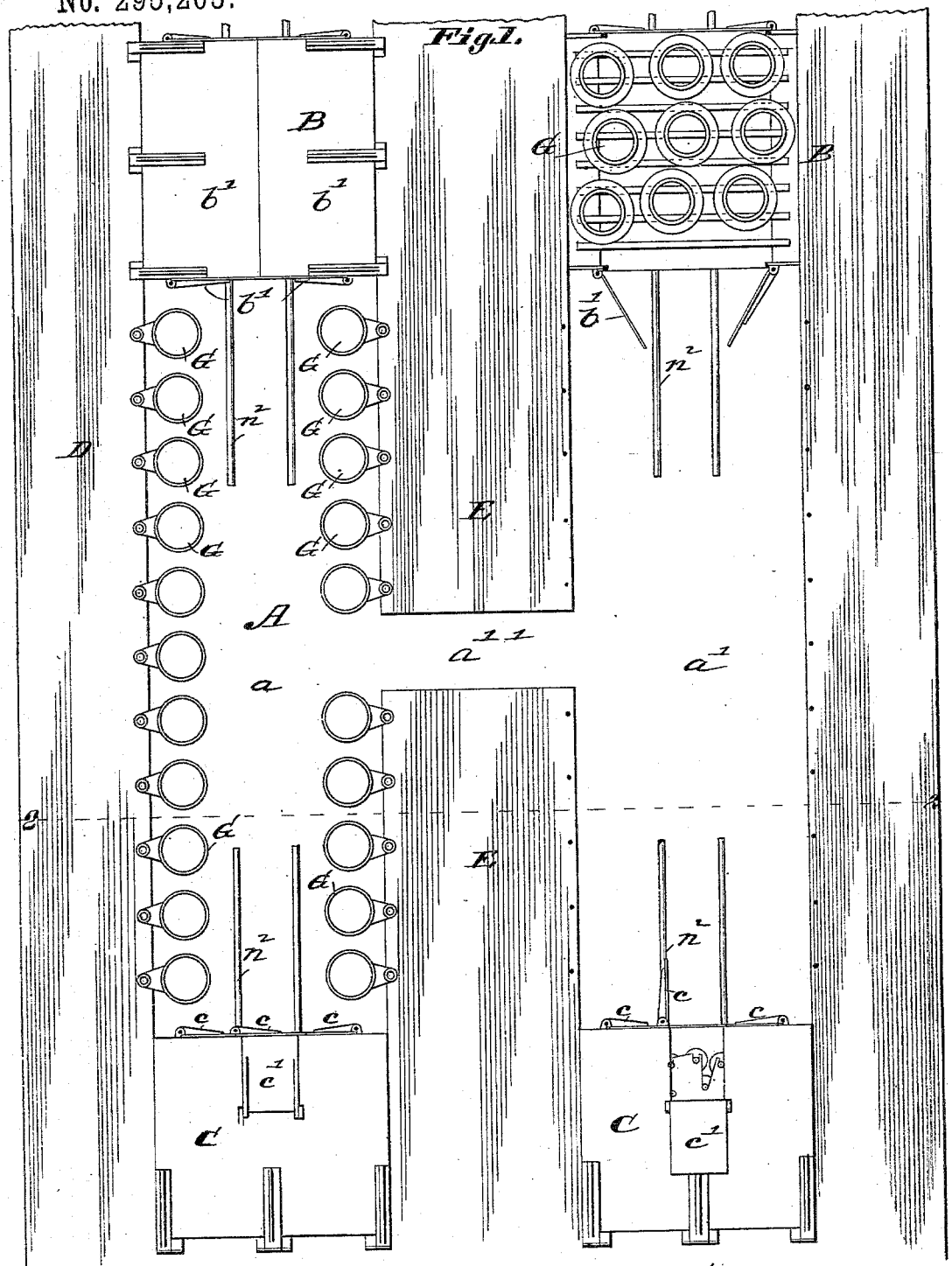

(No Model.)  
5 Sheets—Sheet 4.
F. SHICKLE.
PIPE MOLDING APPARATUS.
No. 295,205.  Patented Mar. 18, 1884.
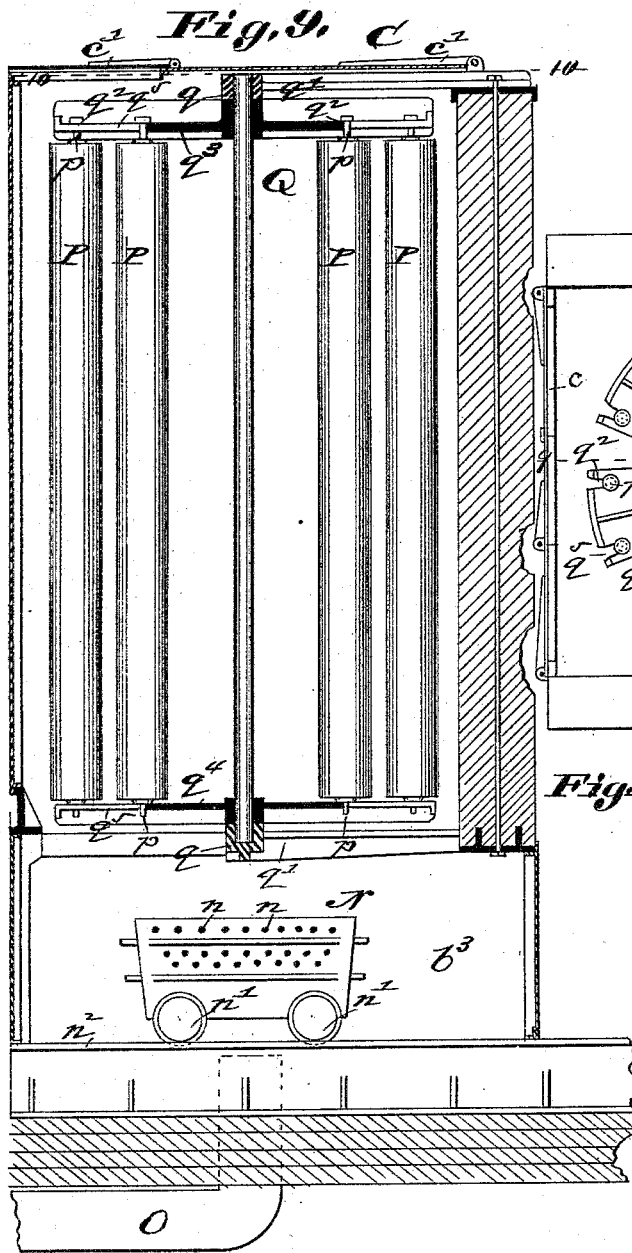
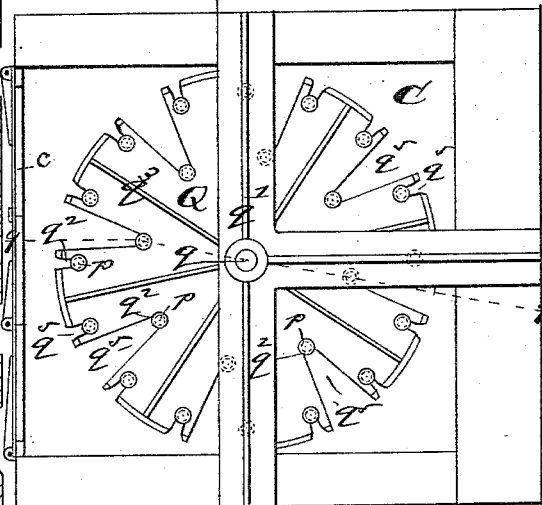
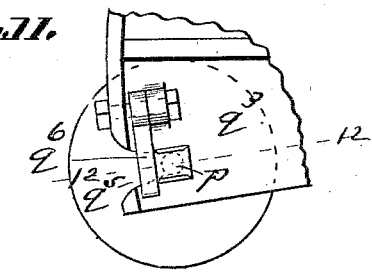
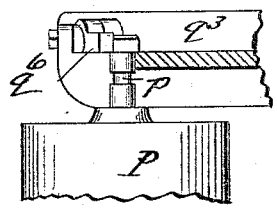
Attest.  
J. W. Hooke.  
W. J. Kes[?]
Inventor;  
Frederick Shickle  
by C. D. Moody  
atty

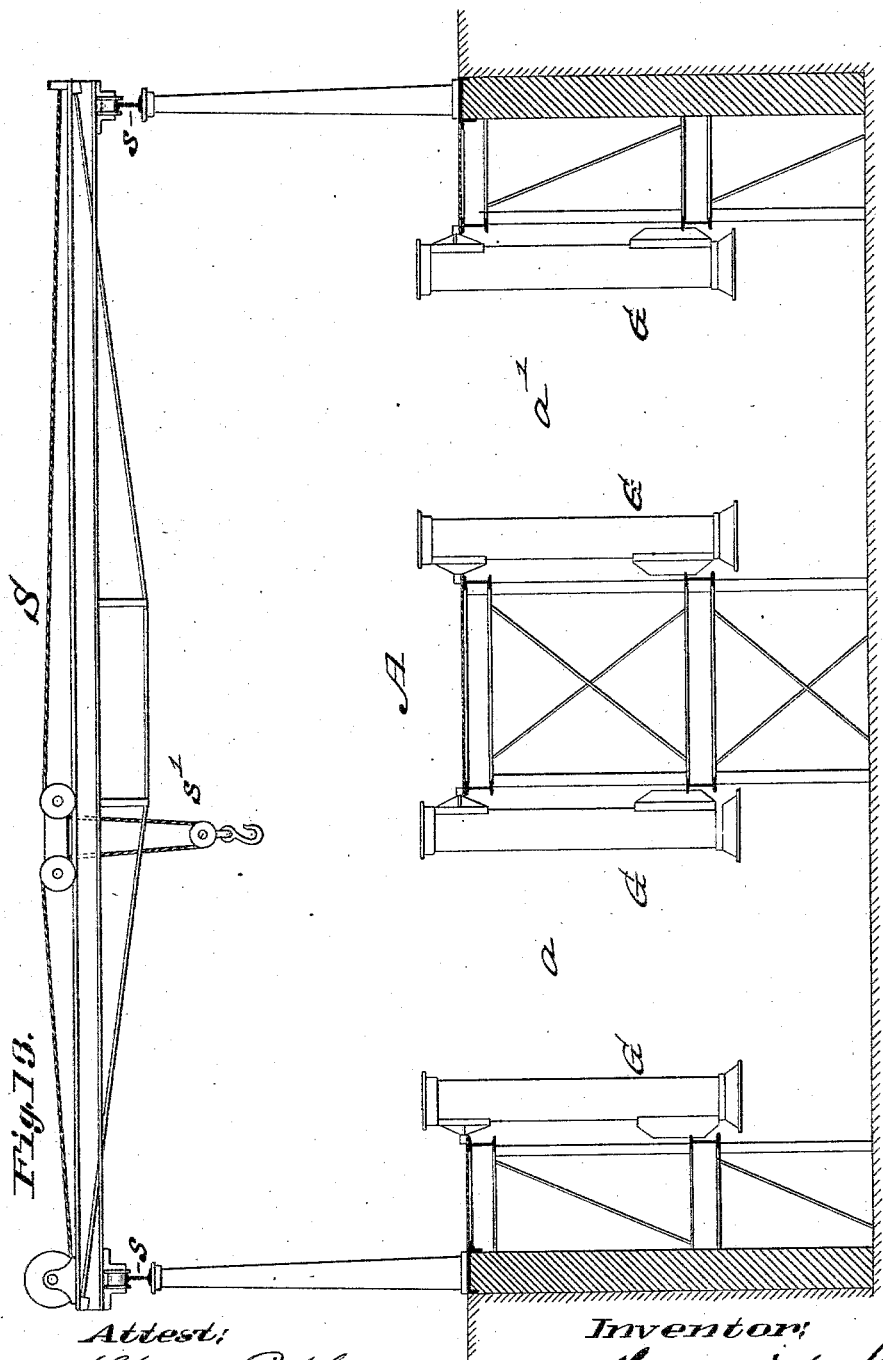

UNITED STATES PATENT OFFICE.

FREDERICK SHICKLE, OF ST. LOUIS, MISSOURI.

PIPE-MOLDING APPARATUS.

SPECIFICATION forming part of Letters Patent No. 295,205, dated March 18, 1884.

Application filed June 25, 1883. (No model.)

*To all whom it may concern:*

Be it known that I, FREDERICK SHICKLE, of St. Louis, Missouri, have made a new and useful Improvement in Pipe-Molding Apparatus, of which the following is a full, clear, and exact description, reference being had to the annexed drawings, making part of this specification, in which—

Figure 1 is a plan of the molding pit and ovens, the top of one of the ovens being removed; Fig. 2, a vertical cross-section on the line 2 2 of Fig. 1; Fig. 3, a horizontal section on the line 3 3 of Fig. 4; Fig. 4, a side elevation showing the upper end of one of the flasks and the part to which it is attached; Fig. 5, a horizontal section on the line 5 5 of Fig. 6; Fig. 6, a side elevation showing the lower end of one of the flasks and the part to which it is confined; Fig. 7, a vertical section, on the line 7 7 of Fig. 8, of the flask-oven; Fig. 8, a horizontal section on the line 8 8 of Fig. 7; Fig. 9, a vertical section of the core-oven; Fig. 10, a horizontal section; Fig. 11, a detail, being a plan of the part shown in Fig. 12; Fig. 12, a side elevation showing the upper end of one of the cores and the part to which it is attached in the oven; and Fig. 13, a vertical section of the molding-pit, showing the traveler.

The same letters of reference denote the same parts.

This invention has relation to the means for supporting the flasks in the pit, to the manner of constructing the flask and core-ovens, and to the means for supporting the flasks and cores, respectively, therein.

A represents the pit. One feature thereof is its division into two or more rooms, $a$ $a'$, which may be connected by the passage $a''$—that is, the pit may have as many separate rooms as in practice may be grouped, and the adjoining rooms may have, for the purpose of transferring the flasks and cores from one room to another, as many connecting passages as may be needed. At the ends of one or more of the rooms $a$ $a'$ the ovens for drying the flasks and cores may be arranged, the flask-ovens B B being, say, at one end of the rooms and the core-ovens C C at the other end, substantially as shown; and, if desired, the rooms, as indicated at the top of Fig. 1, may be extended beyond the ovens. The pit is surrounded by a platform, D, and between the rooms $a$ $a'$ are the platforms E E. This provides ample support for those of the operatives who are employed at the top of the pit, and by thus dividing the pit a large number of flasks can be handled and operated in a comparatively small space and with a single hoisting device—such as the traveling crane S, Fig. 13, whose track rolls upon the elevated rails $s$ $s$, and whose hoist $s'$ can be moved over all the compartments—for with such device suitably arranged and operated from overhead the various flasks, cores, and pipes can be moved along the rooms, transferred to and from the ovens, transferred to and from the various rooms, and from one room to another, and elevated and lowered, as desired. Another feature is the relative position of the pit-wall and the flasks when suspended in the pit.

Heretofore it has been the practice to suspend pipe-flasks in immediate proximity to the pit-wall F. I have ascertained it is desirable to provide room between the flasks and the pit-wall, so that the operatives can reach readily all around the lower end of the flasks. To this end the flasks are in the present instance suspended at such a distance from the wall F as to enable a person to practically pass entirely around the flask, and, as the most desirable means therefor, the flasks G G G are hung upon a beam H, which in turn is upheld upon a row of posts, I, Fig. 2. The posts, at the top, are braced by the beams J, and at or toward the level of the lower ends of the flasks are braced by the beams J'. The posts may also be stayed by tie-rods K K. A horizontal beam, L, is attached to the posts I, and the flasks, at their lower ends, are thereby supported laterally. This is shown more distinctly in Figs. 5, 6. The flask is provided with a bracket, $g$, one edge, $g'$, of which engages in the notch $l$ in the beam L. The notch $l$ is in line perpendicularly with the pivot $g^2$, upon which the flask, at its upper end, is hung, as shown more distinctly in Figs. 3, 4. The bracket $g$ is provided with a shoulder in the form of a flange, $g^3$, and by means of the hook M, one end of which hooks upon the flange $g^3$ and the other end, at $m$, catches against the beam L, the flask is confined to the beam L and prevented from swinging outward therefrom, which otherwise is liable to occur when the core bar or pattern is being withdrawn from the flask. The hook M can be detached when it is desired to remove the flask. The same method may be employed in suspending the flasks G' G' G'—that is, in place of the closed wall, the posts I' I', the beams H' J² L', and the tie-rods K' K' are employed, as shown in Fig. 2, forming an open-work construction, which enables the operatives to pass all around the flasks G' G', and also one which is self-sustaining. The platforms D E E rest upon the beams J J² respectively.

The construction of the flask-ovens B B is shown more distinctly in Figs. 7, 8. The ovens have doors $b$ $b$, which swing horizontally to enable the flasks to be transferred to and from the pit, and the oven-tops $b'$ $b'$ are also removable to provide for the hoist-chains in handling the flasks. The flasks rest in the oven upon the bars $b^2$ $b^2$, which are spaced apart, as shown, to provide for the passage upward into the oven of the heat, which is transmitted, preferably, from the fire-box N. This "fire-box" or "grate," as it may be indifferently termed, is shaped to contain fuel, has apertures $n$ $n$ for the admission of air to the fuel, and is mounted on wheels $n'$ $n'$, to enable the fire-box to be rolled on the track $n^2$ into and out of the chamber $b^3$. For to replenish the box it may be withdrawn into the pit, there filled, and then rolled back again into the chamber $b^3$. An air-blast introduced through the inlet-duct O, and advantageously to reach the fire-box, may be employed to supply air thereto in any desired quantity.

Similar devices may be similarly employed to heat the core-ovens C C. These ovens have the horizontally-swinging doors $c$ $c$ and the removable or hinged tops $c'$ $c'$. The cores P P P are supported in the oven by means of the reel Q. The reel is arranged vertically, and is journaled at $q$ $q$ in the bars $q'$ $q'$. The cores are set into the reel by passing the journals $p$ $p$ $p$ of the core-bars into bearings $q^2$ $q^2$ $q^2$ in the top $q^3$ and bottom $q^4$ of the reel, as shown in Figs. 9, 10, 11, 12. The bearings $q^2 q^2$ are at the inner ends of the slots $q^5$ $q^5$ in the top $q^3$ and bottom $q^4$. In this manner a comparatively large number of cores can be packed into a limited space, and so as to be entirely free of each other and readily moved, for by rotating the reel in its journal-bearings any part or side of it is made accessible. The cores are secured in the bearings $q^2$ $q^2$ by means of the hinged bars $q^6$ $q^6$, which, after inserting the core in its place in the reel, are turned down upon the outer side of the journals $p$ $p$, as shown in Figs. 11, 12.

The pit A is shown in a rectangular form; but I do not desire to be confined to this form. It may, for instance, be made circular.

The room $a$ may be extended to form an outer circle, and the room $a'$ to form an inner circle, and the two concentric circles be connected by passage-ways—such as $a''$—without departing from the principle of the improvement. So far as supporting the flasks upon an open-work construction is concerned, the flasks may be above ground as well as in a pit, and in carrying out this feature of the improvement I do not wish to be confined to what is termed a "molding-pit," for by means of such a support the operatives not only can approach the flasks from all sides, but also be able to carry on an otherwise very oppressive work with more comfort and safety. The air can circulate through the construction, and in case of accident the operatives have more opportunity for escape.

I claim—

1. The combination, in a molding-pit, of the beam H and the posts I I I, said posts being suitably braced laterally, for the purpose described.

2. The combination of the beams H L J J', the posts I I I, and the wall F, as described.

3. The combination of the pit A, the posts I' I' I', and the beams H' L' J² J³, as described.

4. The combination of the beam L, the flask G, having the shoulder $g^3$, and the hook M, as described.

5. The oven C, having the vertically-arranged doors $c$ $c$ and the vertically-arranged reel Q, as and for the purpose described.

6. The combination of the top $q^3$, having the slot $q^5$, the core P, and the bar $q^6$, as and for the purpose described.

Witness my hand this 21st June, 1883.

FREDERICK SHICKLE.

Witnesses:
C. D. MOODY,
E. PARMER.